United States Patent Office 3,772,268
Patented Nov. 13, 1973

3,772,268
PURIFICATION OF COPPER CONTAMINATED DYE COMPOUNDS USING DI(HYDROXY-ALKYL) SULFIDES
Ralph R. Giles and James M. Straley, Kingsport, Tenn., assignors to Eastman Kodak Company, Rochester, N.Y.
No Drawing. Filed Dec. 20, 1971, Ser. No. 210,172
Int. Cl. C07c 107/00; C09b 43/00
U.S. Cl. 260—208                                    7 Claims

ABSTRACT OF THE DISCLOSURE

Copper impurities in dye compounds are removed by contacting such a contaminated compound with a di(hydroxyalkyl)sulfide and recovering the dye substantially free of copper. The process can be employed in conjunction with the synthesis of cyano substituted dyes by cyanide displacement reactions which employ copper as a catalyst. The purification process results in certain addition compounds of a cuprous or cupric salt and the di(hydroxyalkyl)sulfide.

---

This invention concerns a novel purification process and more particularly, a novel process for removing copper impurities from dye compounds. The invention also concerns the novel copper complexes formed during the purification process.

Dye compounds can become contaminated with cuprous and cupric salts in numerous ways. The most common causes of such contamination include the use of catalysts in the synthesis of the dye compound or a precursor thereof, the use of apparatus and containers in which dye compounds are synthesized, and copper present in water used in the processing of the dye compound.

The presence of copper impurities in dye compounds can affect the shade produced by the dye compound and/or other dyes used in combination with a copper-contaminated dye. Copper impurities also can degrade polymeric materials with which the dye comes in contact such as rubber pad and print rolls of dyeing apparatus and the latex backing of carpets.

Common physical treatments such as reslurring and recrystallization not only are expensive but do not decrease the amount of copper impurity to an acceptable level. Even the use of known copper-complexing agents, such as ammonium hydroxide, pyridine and quinoline, and organic solvents, such as dimethylformamide, N-methylpyrrolidone and dimethylsulfoxide, leave substantial amounts of copper in the contaminated dye.

We have discovered that cuprous and cupric salt impurities in dye compounds can be decreased by contacting the copper-contaminated dye with a di(lower-hydroxyalkyl)sulfide. By so treating a copper-contaminated dye, the copper content can be decreased from amounts as high as 30,000 parts per million (p.p.m.) to less than 50 p.p.m. Accordingly, our novel process comprises contacting a copper-contaminated dye with a di(hydroxyalkyl)sulfide, or a mixture of a di(hydroxyalkyl)sulfide and another organic solvent, and recovering the purified dye compound. Although a substantial portion of the copper salt impurity can be removed from a copper-contaminated dye compound by simply contacting the dye compound with a di(hydroxyalkyl)sulfide, superior results are realized if the copper-contaminated compound is dissolved in a di(hydroxyalkyl)sulfide or a mixture thereof with another organic solvent. If the contaminated dye compound is not dissolved, it should be finely divided so as to permit intimate contact with the di(hydroxyalkyl)sulfide which forms a complex with, and thus dissolves, the copper salt. If the dye compound is dissolved, it can be recovered from the di(hydroxyalkyl)sulfide-dye compound solution by known precipitation techniques, leaving the copper salt impurity in solution.

When not used with another organic solvent, the amount of the di(hydroxyalkyl)sulfide employed in our process is not important as long as it is sufficient to dissolve the copper impurity present in the dye. Good results are obtained by using a weight ratio of di(hydroxyalkyl)sulfide to unpurified dye compound of about 5:1 to about 12:1 when only the sulfide compound is used as the solvent. If one or more other organic solvents are used in combination with a di(hydroxyalkyl)sulfide, the amount of the latter should constitute at least 25%, and preferably 50% to about 75% of the total weight of the solvent system. Examples of such other organic solvents which can be used in our process include N,N-di-lower alkylformamides, N,N-di-lower alkylacetamides, trilower alkylphosphates, glycols, glycol ethers, N-alkylpyrrolidinones, etc. N,N-dimethylacetamide, N,N-dimethylformamide, triethyl phosphate, ethylene glycol, 2-methoxyethanol and N-methylpyrrolidinone are typical of such organic solvents.

When a solvent system, i.e., one or more other organic solvents in addition to a di(hydroxyalkyl)sulfide, is used, the amount required can be varied substantially, depending on a number of factors such as the solubility of the dye in each of the components of the solvent system and the composition of the system. Dye:solvent system weight ratios in the range of about 1:5 to about 1:10 have been found to give good results although other ratios may give optimum results if certain organic solvents are employed. The use of large amounts of solvent is not desirable because precipitation of the dye may be rendered difficult and thus can result in decreased yields of purified dye. The process can be carried out over a wide temperature range such as 25° C. to 150° C. To dissolve the copper-contaminated azo compound within a reasonable period of time, we prefer to heat the dye-solvent mixture to about 65° C. to about 110° C.

The di(hydroxyalkyl)sulfides useful in our process have the general formula HO—R¹—S—R²—OH in which $R^1$ and $R^2$ are straight-or branch-chain alkylene groups containing two to about four carbon atoms. Typical of the di(lower-hydroxyalkyl)sulfides are di(2-hydroxyethyl) sulfide, 2-hydroxyethyl-3 - hydroxypropylsulfide, 2-hydroxyethyl-2-hydroxyisopropylsulfide, 2-hydroxyethyl-2-hydroxypropylsulfide, di(2-hydroxypropyl)sulfide, etc. Because of its commercial availability and cost, di(2-hydroxyethyl)sulfide is preferred.

Our process can be used to purify various types of dye compounds such as azo, anthraquinone, methine, naphthazarin, nitro, quinophthalones dye compounds. Generally, the dye compound should be essentially water-insoluble so that it may be recovered from the di(hydroxyalkyl) sulfide solution. The process is particularly useful in the purification of copper-contaminated monoazo compounds of the disperse dye types. Such compounds have the general formula A—N=N—B wherein A is the residue of a carboxylic or heterocyclic diazotizable amine, i.e., a disperse dye diazo component, and B is the residue of an azo coupling component. Disperse dyes are characterized by low water solubility due to the absence therefrom of water-solubilizing groups. Such dyes are described extensively in the patent literature.

The dissolved dye can be precipitated from solution by diluting the solution with water according to known techniques. We have found that the amount of copper in the purified dye is minimized if the dye is precipitated from solution by adding to the solution only as much water as is needed to cause complete precipitation. It is particularly desirable that the precipitate consists of small crystals which do not adsorb or occlude the water-soluble copper-di(hydroxyalkyl)sulfide compounds and can be filtered readily and thoroughly.

A particularly advantageous technique of using our novel process is in conjunction with known cyanide displacement reactions which employ copper as a catalyst. In such a displacement reaction, a dye containing a labile halogen atom is reacted with cuprous cyanide, $$K_3Cu(CN)_4$$

or a combination of a cuprous salt, such as cuprous bromide, cuprous chloride and cuprous acetate, and a cyanide, such as sodium or potassium cyanide. When the halide atom to be displaced is present on an aryl diazo component of an azo dye compound, it is activated by the presence of electronegative substituents, such as nitro and acyl groups, on the aryl groups. The reactivity of such a halide atom is further increased when the coupling component is an aryl group substituted with an acylamido group at the position ortho to the azo group.

If the reaction is carried out in conventional solvents such as dimethylformamide or pyridine, the dye product contains substantial amounts of copper when precipitated from the reaction mixture. However, if a di(hydroxyalkyl)sulfide, either alone or in combination with another solvent, is used as the reaction medium, the cyano-substituted dye product containing little, if any, copper can be obtained. Incorporating our purification process into the described cyanide displacement reaction gives superior results, apparently because the copper contaminants are more available for complexing with the di(hydroxyalkyl)sulfide.

The amount of the di(hydroxyalkyl)sulfide is not critical as is pointed out above but is determined primarily by the solubility of the azo intermediate. When the di(hydroxyalkyl)sulfide is the sole solvent for the displacement reaction, sulfide to dye intermediate weight ratios of 5:1 to about 12:1 generally give good results. The solvent systems and the amounts of the components thereof, as described above, also can be employed as the reaction medium for the displacement reaction. The temperature required for the displacement reaction can be varied widely depending upon the particular azo reactant, i.e., the activity of the halogen atom to be reacted. Generally, temperatures of 25° to about 150° C. will result in the conversion of the halo-substituted azo reactant to the corresponding cyano-substituted azo compound.

Our novel process is further illustrated by the following examples. Quantities of copper reported are determined by atomic absorption analysis.

EXAMPLE 1

A solution of 2.7 g. of 3-acetamido-4-(2-bromo-4,6-dinitrophenylazo)-N-benzyl-N-ethylaniline and 0.54 g. of cuprous cyanide in 15 cc. of pyridine is heated for 15 minutes at 100° C. The product, 3-acetamido-4-(2-cyano-4,6-dinitrophenylazo)-N-benzyl-N-ethylaniline, is precipitated by drowning the reaction mixture in water and is collected by filtration, washed with water and dried. The product contains 26,420 p.p.m. copper. The product (0.75 g.) is dissolved in 10 cc. of di(2-hydroxyethyl)sulfide and the solution is stirred for 15 minutes at 95° C. After cooling the solution to 25° C., 10 cc. of water is added dropwise to the solution over a five-minute period. The precipitated compound then is filtered off, washed with 125 cc. of water and dried at 60° C. The compound thus treated contains only 400 p.p.m. copper.

EXAMPLE 2

A commercial dye mix containing 20% by weight of 1-amino-4-hydroxy-2-phenoxyanthraquinone contains 497 p.p.m. copper corresponding to 2485 p.p.m. copper based on the dye present. Three grams of the commercial dye mix is stirred in 20 cc. of di(2-hydroxyethyl)sulfide and 10 cc. of dimethylformamide. The mix is stirred at 90–95° C. for 25 minutes and then 20 cc. of water is added dropwise. After cooling the mixture to room temperature, the dye is filtered off, washed with water and dried. The anthraquinone compound contains 40 p.p.m. copper.

EXAMPLE 3

A solution of 10 g. 3-chloro-4-(4-nitrophenylazo)-N,N-dimethylaniline, 4.2 g. cuprous cyanide, 70 cc. of di(2-hydroxyethyl)sulfide and 35 cc. triethyl phosphate is heated at 135–140° C. for seven hours. After allowing the reaction mixture to cool to room temperature, 70 cc. of water is added in small portions over a ten-minute period. The product, 3-cyano-4-(4-nitrophenylazo)-N,N-dimethylaniline is filtered off, washed with water and dried. The product (9.1 g.) contains 18 p.p.m. copper.

EXAMPLE 4

Cuprous bromide (0.35 g.) is dissolved in a mixture of 10 ml. of di(2-hydroxyethyl)sulfide and 5 ml. of triethyl phosphate at 70–75° C. Then 0.75 g. (0.006 mol) of 38% aqueous sodium cyanide solution is added. At 90° C., 2.7 g. (0.005 mol) of 2-(2-bromo-4,6-dinitrophenylazo)-5-(ethylbenzylamine)acetamide is added. The reaction mixture is heated at 90–95° C. for 15 minutes and then allowed to cool to 50° C. Over a period of five minutes, 10 ml. of water is added dropwise. The mixture is stirred for five minutes and the product, 2-(2-cyano-4,6-dinitrophenylazo)-5-(ethylbenzylamino)acetanilide, is collected by filtration, washed first with 75 ml. of 10% ammonium hydroxide and then with water and dried at room temperature. The 2.2 g. of product obtained contains no detectable copper.

EXAMPLE 5

Cuprous bromide (0.35 g.) and sodium cyanide (0.71 g. of a 38% aqueous solution) are dissolved in a mixture of 10 ml. of di(2-hydroxyethyl) sulfide and 5 ml. of dimethylformamide. The azo reactant described in the preceding example (2.70 g.) is added and the temperature of the reaction mixture is quickly brought to 96° C. Heating is discontinued after a test indicates the absence of the azo reactant. At room temperature, a solution of 1.2 g. sodium citrate in 10 ml. water is added dropwise. The resulting precipitate is filtered off, washed with 25 ml. 10% ammonium hydroxide, washed with water until the filtrate is neutral and then dried at 60° C. The copper content of the product is 52 p.p.m.

The dye compounds which can be purified according to our novel process can be used to color a wide variety of textile materials, the type of dye determining the textile material for which it is most suited.

The copper compounds of the invention are the addition compounds of a copper salt and a di(hydroxyalkyl)sulfide having the formula HO—R¹—S—R²—OH wherein $R^1$ and $R^2$ each is a straight- or branch-chain alkylene group containing from 1 to about 4 carbon atoms. Examples of such copper salts include cuprous and cupric halides such as chlorides and bromides, lower alkanoates such as acetates, sulfates, cyanides and sulfites. The novel compounds are prepared by adding a copper salt to the di(hydroxyalkyl) sulfide. The bluish green cupric addition compound can be converted to the colorless cuprous compound by known means such as by adding a bisulfite to a solution of the cupric compound until the bluish green color has been discharged.

Our novel copper-di(hydroxyalkyl)sulfide compounds are soluble in many organic solvents, making the copper available for a wide variety of applications. More importantly, our compounds are soluble in water in contrast to known copper-dialkylsulfide compounds. Thus, the cuprous cyanide-di(hydroxyalkyl)sulfide can be used in the form of an aqueous solution as a herbicide as is disclosed in U.S. Pat. 3,063,025. Our novel cuprous compounds can be used in the "cuprous ion" technique of dyeing acrylic fibers as disclosed in the literature such as American Dyestuff Reporter, 41, p. 39 (1952). This technique of dyeing requires a stable solution of a cuprous compound which is unaffected by the usual acids and alkalies used in dyeing. If the cuprous compound solution is not stable during the dyeing procedure, precipitation from the bath will result, causing contamination of both the fabric and dyeing apparatus. Our copper-dialkylsulfide compounds dissolve in many organic solvents, making the copper available for various applications such as preparing metallized dyes or replacing reactive groups such as halogen atoms.

The following examples further describe the preparation of our novel addition compounds and the usefulness thereof.

EXAMPLE 6

One gram of dry cuprous chloride is dissolved by warming in 2 grams of di(2-hydroxyethyl)sulfide. When cooling did not cause precipitation, the viscous reaction mixture was diluted with 10 cc. of boiling alcohol to give a light yellow solution. Allowing the solution to stand 24 hours in air results in the formation of green needles, believed to be the cupric compound, melting at 142–144° C. and insoluble in boiling alcohol. A compound believed to be the cuprous addition compound is obtained as colorless hexagonal plates melting at 56–57° C. if the above technique is performed under nitrogen.

EXAMPLE 7

Two grams of cupric acetate is dissolved in 50 cc. of hot water and 10 g. of di(2-hyroxyethyl)sulfide. Solid sodium bisulfite is added until the blue-green color is completely discharged. No precipitate formed upon cooling the clear colorless solution.

EXAMPLE 8

A solution of 0.2 g. of cuprous chloride in 2 cc. of di(2-hydroxyethyl)sulfide is added to 4 g. 4-(6-methylsulfonyl-2-benzothiazolylazo)-3 - hydroxydiphenylamine dissolved in 25 cc. of boiling ethanol. The original red color of the azo compound solution changes to a deep violet and upon cooling a dark violet powder precipitates. The powder consists essentially of the metallized form of the azo compound.

EXAMPLE 9

Cupric sulfate crystals (1 g.), 4 g. of di(2-hydroxyethyl)sulfide and 5 g. water are heated to solution. The cupric coupler is converted to the colorless cuprous form by the addition of bisulfite. The solution remains clear upon cooling and the cuprous compound reverts to the cupric form only after several weeks of exposure to air.

EXAMPLE 10

Ten-gram samples of an acrylic fabric (Orlon) were dyed in three dyebaths containing the following ingredients:

Dyebath A: 200 cc. water; 20 mg. Pontacyl Fast Red AS (C.I. Acid Red 88).

Dyebath B: 200 cc. water; 4 g. di(2-hydroxyethyl)sulfide; 20 mg. Pontacyl Fast Red AS.

Dyebath C: 200 cc. water; 20 mg. Pontacyl Fast Red AS; 1 g. cupric acetate and 4 g. of di(2-hydroxyethyl)sulfide dissolved in 9 cc. of water and treated with bisulfite to convert the cupric addition compound to the cuprous form.

The fabrics are immersed in the dyebaths and dyed at the boil for 90 minutes, after the addition of 1 cc. glacial acetic acid to each of the dyebaths. The fabrics are removed from the dyebaths and rinsed in hot water. The fabrics dyed in baths A and B are not colored appreciably while the fabric dyed in bath C is dyed a deep red which exhibited good wash-fastness. The precise composition of the above-described copper-di(hydroxyalkyl)sulfide compounds is not known, although we believe the cuprous addition compounds to consist of two molecules of di(hydroxyalkyl)sulfide per molecule of copper. The precise constitution of our novel addition compounds is not important since the usefulness of the compounds is due to the presence of copper.

The invention has been described in detail with particular reference to preferred embodiments thereof, but it will be understood that variations and modifications can be effected within the spirit and scope of the invention.

We claim:

1. A process for purifying a copper-contaminated essentially water-insoluble textile dye which comprises effecting a solution of the copper-contaminated dye in an organic solvent containing at least 25%, based on the weight of the dye, of a compound having the formula HO—$R^1$—S—$R^2$—OH, wherein $R^1$ and $R^2$ each is alkylene of two to four carbon atoms, precipitating and recovering the dye.

2. A process according to claim 1 wherein the solvent is a compound having the formula HO—$R^1$—S—$R^2$—OH and the dye is a disperse azo dye.

3. A process according to claim 1 wherein the solvent is di(2-hydroxyethyl)sulfide and the dye is a disperse azo dye.

4. A process according to claim 1 wherein the solvent is a combination of (1) about 25 to about 75%, based on the weight of the solvent, of a compound having the formula HO—$R^1$—S—$R^2$—OH and (2) a di-lower-alkylformamide, a di-lower-alkylacetamide or a tri-lower-alkylphosphate, the weight ratio of solvent to dye being about 1:5 to about 1:10 and wherein the dye is a disperse azo dye.

5. In the process of preparing a cyano-substituted essentially water-insoluble textile dye by heating a halo-substituted dye with a cyanide in the presence of a cuprous salt, the improvement comprising performing the process in an organic solvent containing at least 25%, based on the weight of the halo-substituted dyes, of a compound having the formula HO—$R^1$—S—$R^2$—OH wherein $R^1$ and $R^2$ each is alkylene of two to four carbon atoms.

6. The process of claim 5 wherein the solvent consists of di(2-hydroxyethyl)sulfide present in a solvent to cyano-substituted dye weight ratio range of about 1:5 to about 1:10 and the halo-substituted dye has the formula

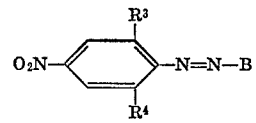

wherein $R^3$ is hydrogen, chlorine, bromine or nitro; $R^4$ is chlorine or bromine; and B is an azo disperse dye coupling component.

7. The process of claim 5 wherein the solvent is a combination of (1) about 25 to about 75 weight percent, based on the solvent, of di(2-hydroxyethyl)sulfide and (2) dimethylformamide, triethylphosphate or a combination thereof; the weight ratio of solvent to halo-substituted dye is about 5:1 to about 10:1; and the halo-substituted dye has the formula

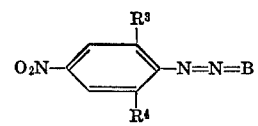

wherein $R^3$ is hydrogen, chlorine, bromine or nitro; $R^4$ is chlorine or bromine; and B is an azo disperse dye coupling component.

References Cited

FOREIGN PATENTS 779,291  2/1968  Canada  260—207.1

LEWIS GOTTS, Primary Examiner

C. F. WARREN, Assistant Examiner

U.S. Cl. X.R.

8—41 A; 260—380, 438.1, 465 R, 701, 158, 205, 207, 207.1

PO-1050
(5/69)

UNITED STATES PATENT OFFICE
CERTIFICATE OF CORRECTION

Patent No. 3,772,268      Dated November 13, 1973

Inventor(s) Ralph R. Giles and James M. Straley

It is certified that error appears in the above-identified patent and that said Letters Patent are hereby corrected as shown below:

Column 1, line 16, delete "cayno" and insert therefor ---cyano---.

Column 6, lines 56-60, Claim 7, delete the formula and insert ---

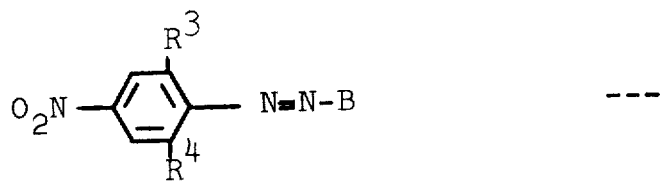

---

Signed and sealed this 4th day of June 1974.

(SEAL)
Attest:

EDWARD M. FLETCHER, JR.
Attesting Officer

C. MARSHALL DANN
Commissioner of Patents